(12) United States Patent
Joslyn et al.

(10) Patent No.: US 10,239,300 B2
(45) Date of Patent: Mar. 26, 2019

(54) SANDWICH PANEL DISBOND REPAIR (71) Applicant: ROHR, INC., Chula Vista, CA (US)

(72) Inventors: Andrew L. Joslyn, Fullerton, CA (US); John Oum, San Bernardino, CA (US); Samadi Yoeuth, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 303 days.

(21) Appl. No.: 15/208,448

(22) Filed: Jul. 12, 2016

(65) Prior Publication Data

US 2018/0015710 A1 Jan. 18, 2018

(51) Int. Cl.
| | |
|---|---|
| *B32B 37/12* | (2006.01) |
| *B32B 37/06* | (2006.01) |
| *B32B 43/00* | (2006.01) |
| *B32B 37/10* | (2006.01) |
| *B64D 29/00* | (2006.01) |
| *B29C 73/02* | (2006.01) |
| *B29C 70/00* | (2006.01) |
| *B32B 3/12* | (2006.01) |
| *B64F 5/40* | (2017.01) |
| *B29L 7/00* | (2006.01) |
| *B32B 37/14* | (2006.01) |

(52) U.S. Cl.
CPC .............. *B32B 37/12* (2013.01); *B29C 70/00* (2013.01); *B29C 73/02* (2013.01); *B29C 73/025* (2013.01); *B32B 3/12* (2013.01); *B32B 37/06* (2013.01); *B32B 37/1018* (2013.01); *B32B 43/00* (2013.01); *B64D 29/00* (2013.01); *B64F 5/40* (2017.01); *B29L 2007/002* (2013.01); *B32B 37/146* (2013.01); *B32B 2250/40* (2013.01); *B32B 2305/72* (2013.01); *B32B 2307/10* (2013.01); *B32B 2605/18* (2013.01)

(58) Field of Classification Search
CPC ...... B32B 37/12; B32B 37/1018; B32B 37/14; B32B 43/00
See application file for complete search history.

(56) References Cited

U.S. PATENT DOCUMENTS

| | | | |
|---|---|---|---|
| 4,335,174 A | | 6/1982 | Belko |
| 6,635,202 B1 | | 10/2003 | Bugg et al. |
| 8,696,843 B1 | * | 4/2014 | Dean ........................ B64F 5/40 156/98 |

(Continued)

FOREIGN PATENT DOCUMENTS

| | | |
|---|---|---|
| EP | 0839635 | 5/1998 |
| EP | 1859923 | 11/2007 |

OTHER PUBLICATIONS

European Patent Office, European Search Report dated Apr. 5, 2018 in Application No. 17180809.0-1019.

*Primary Examiner* — Jeffrey H Aftergut
*Assistant Examiner* — Jaeyun Lee
(74) *Attorney, Agent, or Firm* — Snell & Wilmer L.L.P.

(57) ABSTRACT

A structural panel for an aircraft nacelle may comprise a first skin, a second skin, and a core sandwiched between them. A disbond may be present between the first skin and the core. A plurality of layers of blueprint film adhesive may be positioned over the disbond. The structural panel may be vacuum bagged, and the blueprint film adhesive may be heated. The blueprint film adhesive may flow through perforations in the first skin and bond the first skin to the core.

18 Claims, 7 Drawing Sheets

(56) References Cited

U.S. PATENT DOCUMENTS

| | | | |
|---|---|---|---|
| 2004/0060652 A1* | 4/2004 | McNeely | B32B 37/1284 |
| | | | 156/285 |
| 2008/0226818 A1 | 9/2008 | Bernus | |
| 2011/0151183 A1 | 2/2011 | Reller et al. | |
| 2013/0056131 A1* | 3/2013 | Whitworth | B29C 37/006 |
| | | | 156/64 |
| 2014/0224408 A1 | 8/2014 | Kuntz et al. | |

* cited by examiner

SANDWICH PANEL DISBOND REPAIR

FIELD

The present disclosure relates to structural sandwich panels, and more particularly, to a method of repairing a disbond in a structural sandwich panel between a core structure and a skin.

BACKGROUND

Aircraft nacelle structures for turbine engines, and other aircraft structures, may be formed using structural sandwich panels which include, for example, a back skin and a top skin with a core material sandwiched there between. In one type of structural sandwich panel the core material is bonded to each of the skins. Despite extensive controls, a disbond may still occur between the core material and a skin as a result of a manufacturing process anomaly and be detected during an inspection process. The disbond may result in a structurally insufficient and therefore rejected part depending on its size and location. Also, disbonds may develop in-service as a result of overstressing the bond joint between the core and the skin. In either case, repair methods are needed to repair the disbond resulting in a restoration of the structural capability so that the part can be used or remain in service.

SUMMARY

A method of repairing a disbond in a structural sandwich panel may comprise positioning a film adhesive adjacent to a skin of the sandwich panel around a disbond between the skin and a core of the sandwich panel, coupling a first release film over the film adhesive, coupling a breather cloth over the film adhesive, enclosing the disbond in a vacuum bag, and applying heat to the film adhesive.

In various embodiments, the method may comprise drilling perforations in the skin prior to the coupling the first release film to the skin. The sandwich panel may comprise an acoustic sandwich panel. The film adhesive may be drilled out of perforations in the skin. The method may comprise positioning the sandwich panel such that an interior surface of the skin is facing away from a direction of gravity during the applying heat. The heat may be applied by a heat blanket. Ambient pressure may force the film adhesive through perforations in the skin. After forcing the film adhesive through the perforations, a thickness of the film adhesive may be less than 20% of a thickness of the sandwich panel. The film adhesive may comprise a blueprint adhesive.

A repair method for a structural acoustic panel having a first skin, a second skin, and a cellular core bonded between the first skin and the second skin, with an area between the first skin and the cellular core defining a disbond may comprise placing a film adhesive on an external surface of the first skin opposite an internal surface that is adjacent to the cellular core, heating the first skin and the film adhesive until the film adhesive liquefies adequately to flow, pushing the liquefied adhesive through perforations formed through the first skin, wetting the internal surface of the first skin and walls of the cellular core with the liquefied adhesive, and curing the liquefied adhesive in place to form a bond between the first skin and the cellular core.

In various embodiments, the heating may be performed using a heat blanket. The pushing may be driven by ambient air pressure. A vacuum may be created within the structural acoustic panel. The structural acoustic panel may be positioned with the internal surface facing opposite a direction of gravity. After the pushing, a thickness of the liquified adhesive may be less than 20% of a thickness of the structural acoustic panel. The cured adhesive may be removed from the perforations in the first skin. The structural acoustic panel may be enclosed in a vacuum bag. The film adhesive may comprise a blueprint adhesive. The film adhesive may comprise a plurality of layers of blueprint adhesive.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
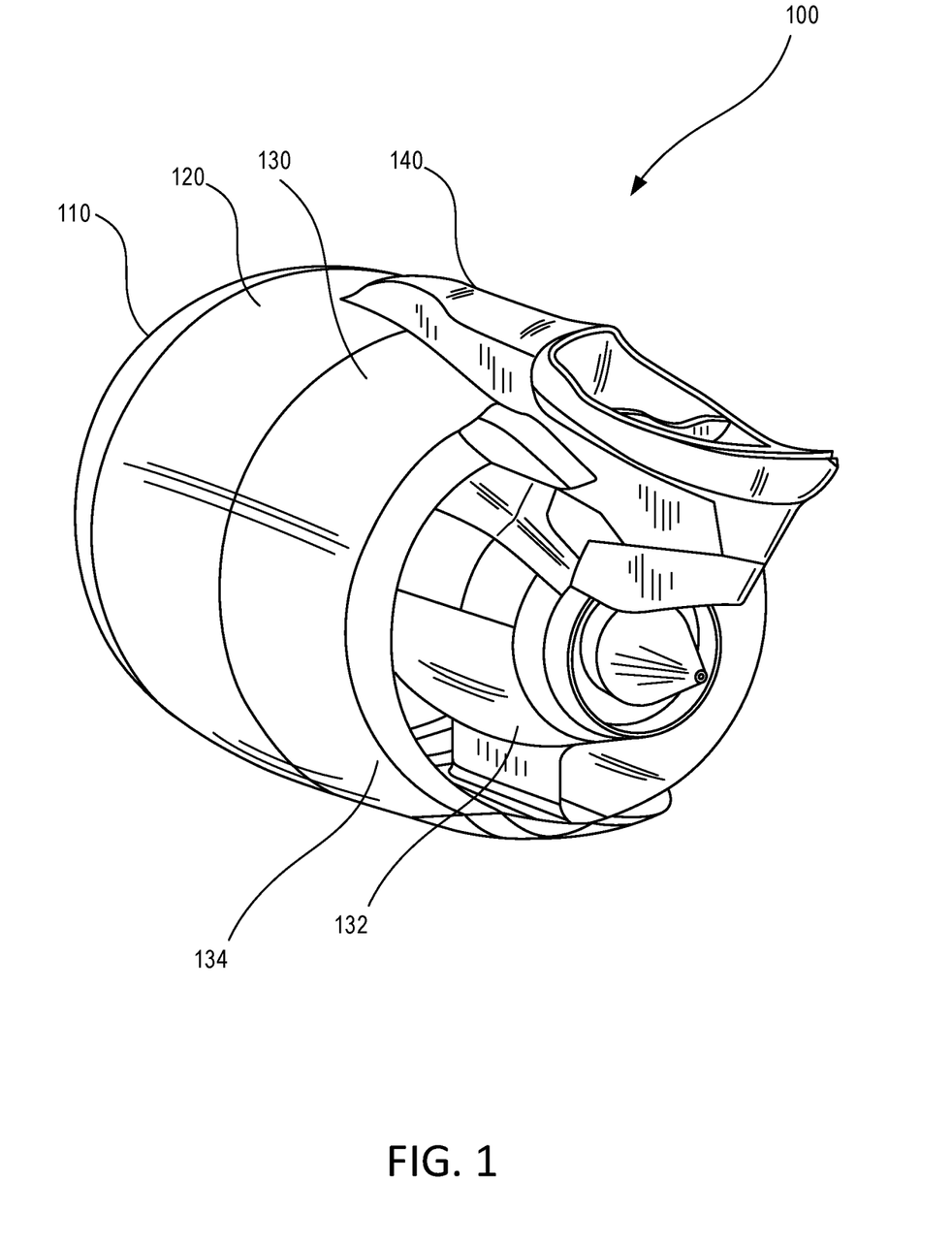
FIG. 1 illustrates a perspective view of a nacelle for an aircraft in accordance with various embodiments.

Referring to FIG. 1, a nacelle 100 for a gas turbine engine is illustrated. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132, an outer fixed structure ("OFS"), and a translating sleeve 134. Bypass air from an engine fan may flow in a generally annular bypass air duct defined between the IFS 132 and the translating sleeve 134. Portions of the inlet 110, fan cowl 120, and thrust reverser 130 may be formed using structural sandwich panels. In addition to nacelles, structural sandwich panels may be used to form other structures on aircraft, or structures used in other applications.

Figure 2:
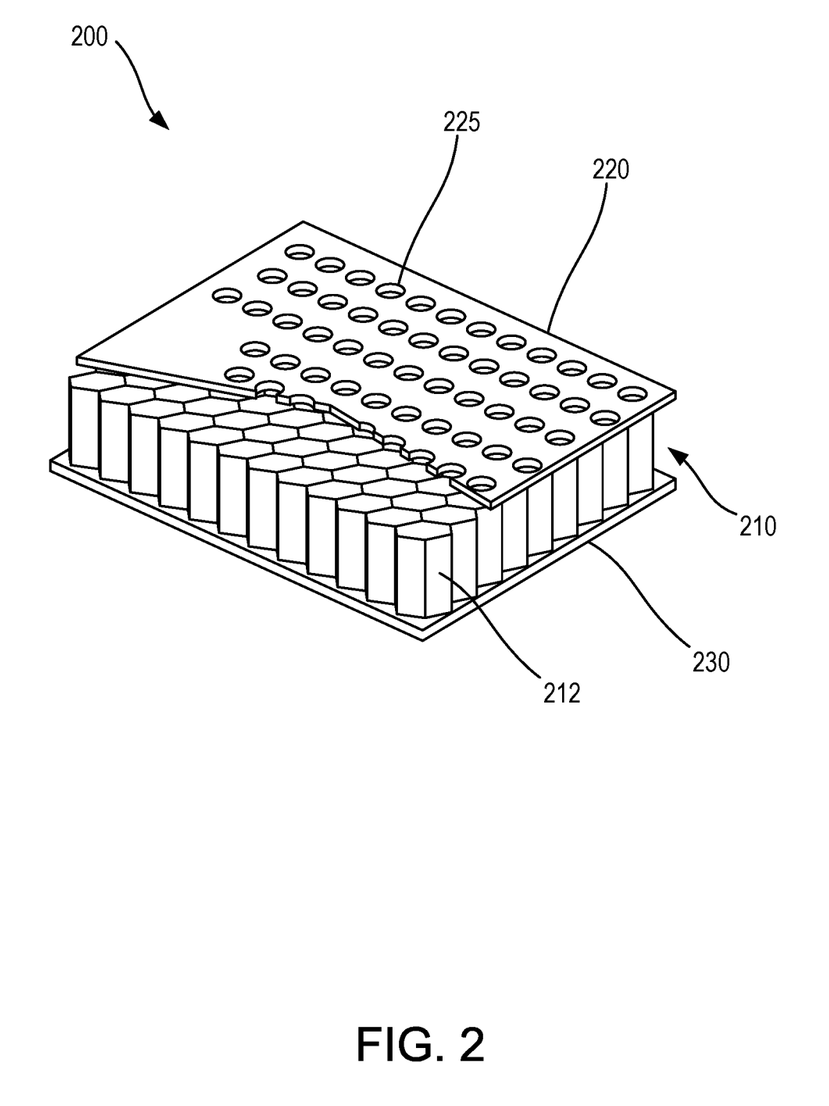
FIG. 2 illustrates a perspective view of a sandwich panel in accordance with various embodiments.

Referring to FIG. 2, a structural sandwich panel 200 is illustrated according to various embodiments. The structural sandwich panel 200 may comprise a core 210, positioned between a first skin 220 and a second skin 230. The core 210 may have walls extending generally in a normal direction from the first skin to the second skin that form a plurality of cells 212. The cells 212 may be hexagonal in shape and are then commonly referred to as honeycomb core. In various embodiments, however, the cells 212 could have any of a number of different geometries. Core walls could be made from various metals such as titanium or aluminum, or composites, or hardened paper or other plastics, according to the material properties that are needed for the particular application. The core walls may be bonded to each other with glue or welding or other methods to form the cellular structure. The first skin 220, core 210, and second skin 230 combine to form closed cells that may become resonator chambers when one of the skins is perforated with perforations 225. The resonator cells work to attenuate acoustic waves, such as noise from an aircraft engine, in a known fashion, in which case the panel is often referred to as an acoustic structural sandwich panel. The first and second skins 220, 230 may be formed of laminar plies of fiber reinforcement joined together with a matrix. The fibers may be carbon, glass, aramid or other known types. The matrix may be thermoset polymers such as epoxies, thermoplastics, and other known materials. The structural sandwich panel 200 is formed by structurally joining together the first skin 220, second skin 230, and core 210, which may be done with adhesive, co-curing, or through other means. In the case of an adhesively bonded core-skin joint, the original type of film adhesive used during the manufacturing process to bond the first skin 220, second skin 230, and core 210 is referred to as the "blueprint adhesive."

Figure 3:
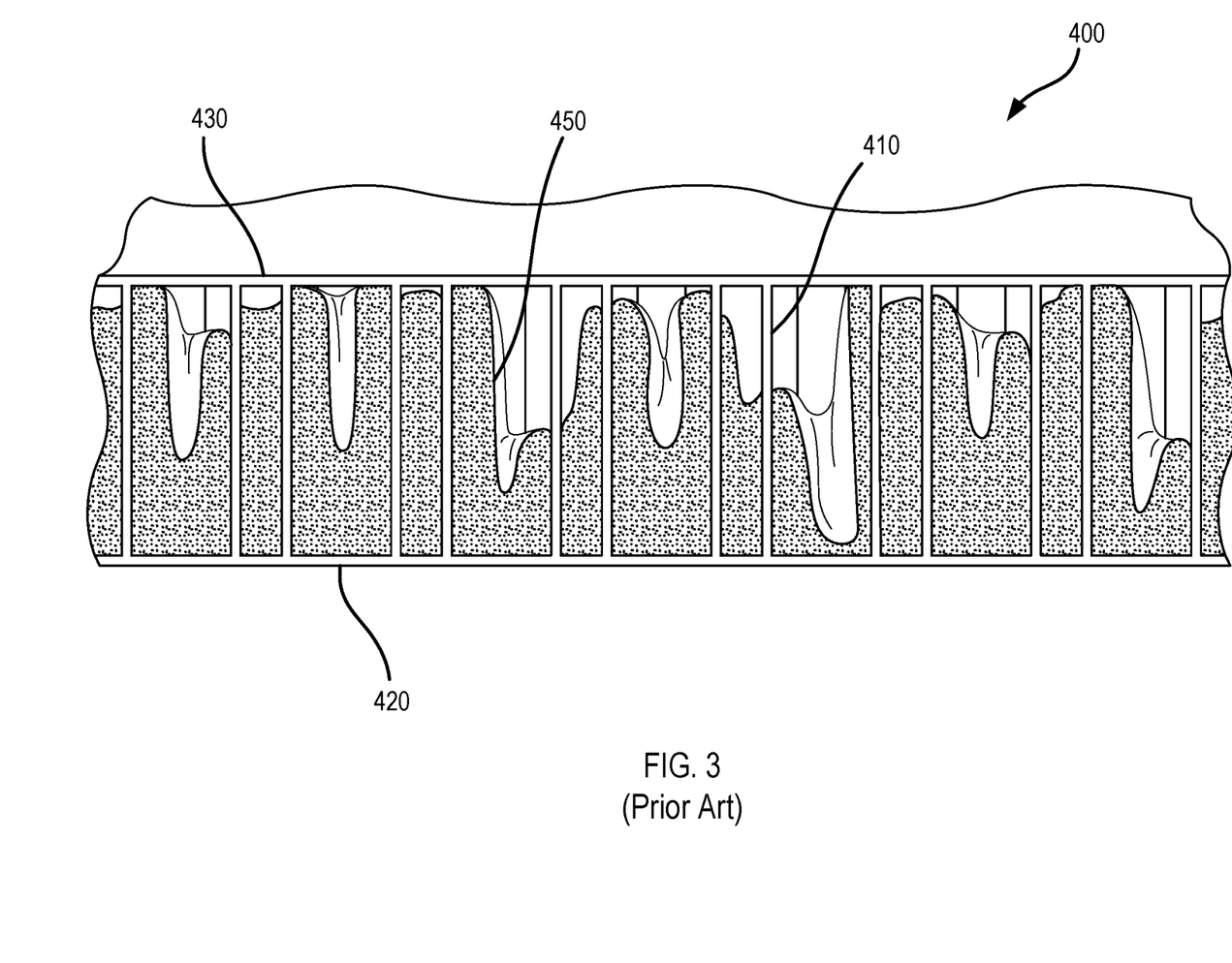
FIG. 3 illustrates a schematic cross-sectional view of a sandwich panel after a repair conducted according to prior art methods.

As a result of manufacturing anomalies, a full bond joint may not be achieved between a portion of the first skin 220 or second skin 230 and the core 210. This might occur, for example, when one section, or blanket, of core 210 does not have the same height as an adjacent blanket, creating a step between them. When the skin, either cured or uncured, is laid up over these adjacent core blankets, it will not make sufficient contact with the core in the area of the step, and as a result may not be properly bonded. Other types of manufacturing anomalies may also result in a disbond. This type of disbond can be detected when the part and the bonds are inspected using known methods. Without a proper bond, depending upon the size and position of the disbond, the structural panel may not have sufficient structural capability and would be rejected and scrapped if not repaired. Also, an in-service structural panel may experience a disbond between one of the skins and the core 210, usually resulting from an application of excess stress on the bond joint. This disbond may be visibly detected, or it might be detected during an inspection. If not repaired, the disbond could result in a requirement to scrap the part and replace it with a new one. In both the in-service scenario and the original manufacturing scenario, scrapping a part due to a disbond may be very costly, and there is therefore a great need for a disbond repair method that restores structural capability of the panel in a verifiable manner so that the part can be confidently used or continue in service. However, very few repair methods exist for repairing this type of disbond, and most do not reliably restore the structural capability and are therefore insufficient for many applications Referring to FIG. 3, a cross-section view of a sandwich panel 400 post repair is illustrated according to one existing repair method. As part of the repair method, a paste adhesive 450 is injected using a syringe or other similar means through perforations in the first skin 420 into the cells. As illustrated, a large amount of paste adhesive 450 is used, in some cases nearly or completely filling the cells between the two skins. This is due to the inability to control where the paste adhesive flows and eventually cures. In some cases it is necessary to nearly or completely fill the cell in order to ensure that a sufficient amount of adhesive is positioned and cures at the joint between the skin and the core walls. The use of excessive amounts of paste adhesive to fill the cells degrades the acoustic capability of the affected cells and adds undesirable extra weight. In addition to these deleterious effects of the large amount of paste adhesive 450 used, the bond between the first skin 420 and the core 410 may not be as strong as an original bond due to the fact that the paste adhesive is not the same as the blueprint adhesive originally designed and used to manufacture the part, and as a result the repair may be classified as non-structural.

Figure 4:
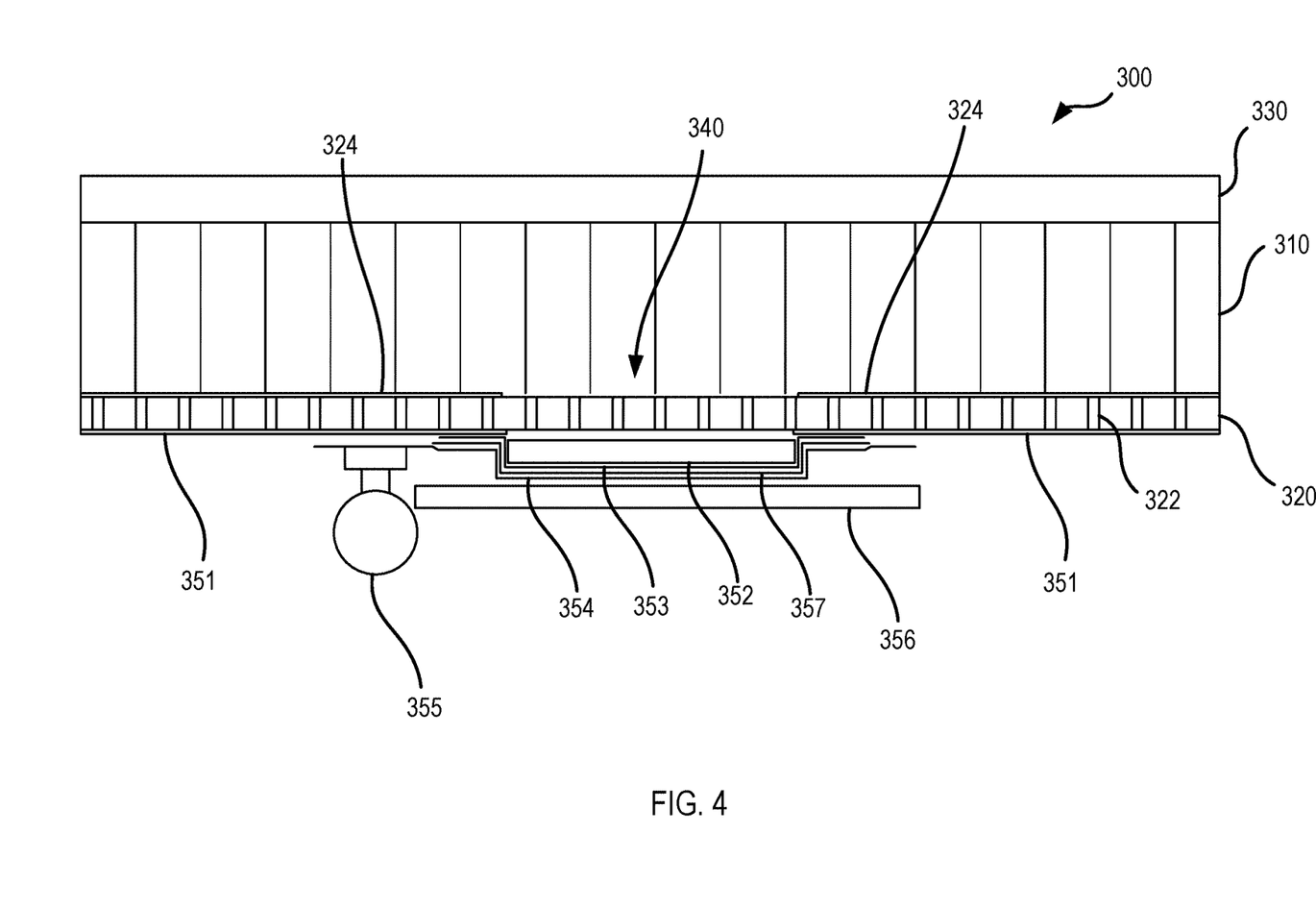
FIG. 4 illustrates a schematic view of a system for repairing a disbond in a sandwich panel in accordance with various embodiments.

Referring to FIG. 4, a schematic view of a method for repairing a disbond in a structural sandwich panel is illustrated according to various embodiments. A sandwich panel 300 may comprise a core 310, a first skin 320, and a second skin 330. The first skin 320 may comprise perforations 322 previously formed in the manufacturing process in the case of an acoustic structural panel. If perforations are not already present, then perforations 322 may be formed as part of the repair process by, for example, drilling through the first skin 320, or through other perforation methods. The first skin 320 has been bonded to the core 310 with the blueprint adhesive 324 in a previous process, but now a disbond (resulting from a manufacturing defect or a later in-service failure) is present between the first skin 320 and the core 310. The disbond is limited to a defined area of the panel that may be identified and marked during an inspection process.

The following is an "out of autoclave" disbond repair method, which is advantageous in that an expensive and energy consuming autoclave is not needed to conduct the repair. Also, it may be possible in some circumstances to perform this repair method on wing, i.e. without removing the part from the aircraft, resulting in additional savings. In a first optional step, a high temperature resistant release material or film 351 may be coupled to the first skin 320 around the boundary of the disbond 340. The high temperature resistant release material 351 may prevent adhesive from flowing to and bonding to undesired areas on the external surface of first skin 320. This may help reduce the amount of clean-up work needed after the repair is complete. A film adhesive 352 may be positioned adjacent to the first skin 320 directly over the area of the disbond 340 and generally within the boundary of the release film 351. In various embodiments, the film adhesive 352 may be the same type of adhesive as the blueprint adhesive 324. The film adhesive 352 may comprise a plurality of layers of blueprint adhesive film. For example, the film adhesive may comprise 10 layers, 5-15 layers, 1-30 layers, or any other suitable number of layers to provide the desired volume of adhesive needed to form an effective repair.

A release film 353 may be placed over the film adhesive 352 and sealed or otherwise attached around its periphery to the optional high temperature resistant release film 351. A breather cloth 357 may be placed over the release film 353. A vacuum bag 354 may be placed over the breather cloth 357. In some setups, it may be necessary or helpful to encapsulate the entire sandwich panel 300 within the vacuum bag 354. But in most scenarios it will be possible to only use the vacuum bag on one side of the sandwich panel directly over the repair area for the disbond 340, and attach and seal it to the first skin 320 or the release film 351.

The sandwich panel 300 may optionally be positioned with the first skin 320 facing down (i.e. toward the ground), such that gravity helps deter the film adhesive 352 (when liquefied) from flowing along the walls of core 310 toward the second skin. However, in some applications it may be possible to conduct this method regardless of the orientation of the sandwich panel relative to gravity. In many cases, the surface tension and viscosity of the liquefied resin should still result in the resin adhering to and flowing along the interior surface of the first skin 320 to wet all the joints between the first skin and the core walls, even when the interior side of the first skin is facing towards the direction of gravity, or is vertically oriented relative to gravity.

A vacuum source 355 may create a vacuum within the vacuum bag 354, as is well known in the art. A heat source 356 may apply heat to the film adhesive 352. In various embodiments, the heat source 356 may comprise a heat blanket. The heat source 356 liquefies the film adhesive 352 to an adequate degree so that it may flow. In various embodiments, the film adhesive 352 may liquefy at approximately 200° F. (93° C.). The liquefied film adhesive 352 may travel through the perforations 322 and onto the interior surface of the first skin 320, flowing there along until it wets all of the joints between the interior of the first skin and the walls of the core, and eventually cures to form a bonded joint there between. Ambient air pressure may drive the film adhesive 352 through the perforations 322 as a result of the vacuum pressure around the first skin. After sufficient application of heat or other curing cycle steps, as necessary depending upon the type of adhesive used, the heat source 356, the vacuum source 355, the vacuum bag 354, the release film 353, and the high temperature resistant release material 351 may be removed from the sandwich panel 300. Any excess adhesive cured on the exterior surface of the first skin 320 may be removed, such as by sanding, buffing, chipping, etc. The perforations 322 may be re-drilled to remove the adhesive and restore the acoustic properties of the sandwich panel 300 in the area of the repair.

Figure 5:
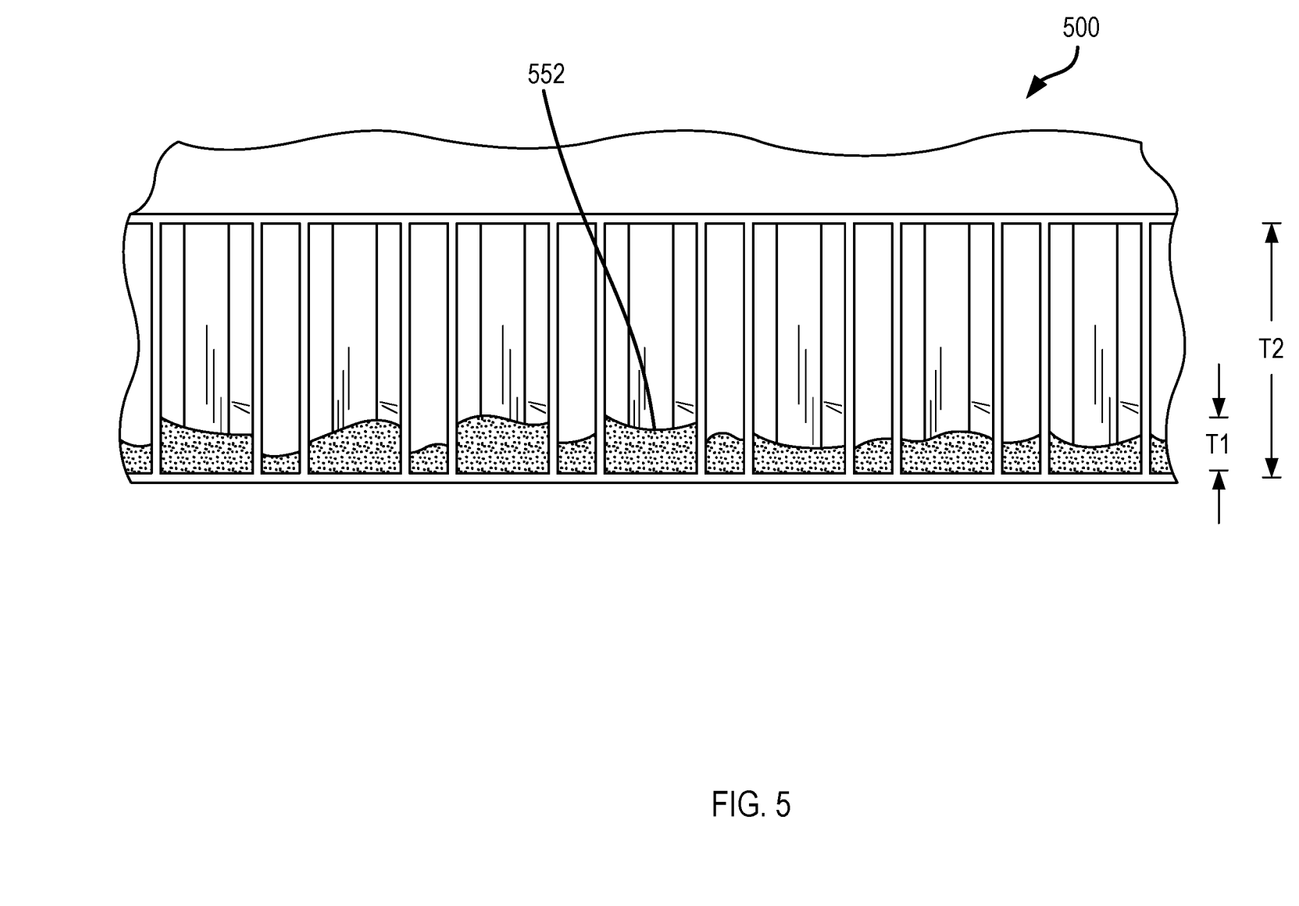
FIG. 5 illustrates a schematic cross-sectional view of a sandwich panel post repair in accordance with various embodiments.

Referring to FIG. 5, a cross-section view of a sandwich panel 500 post repair is illustrated according to various embodiments using the repair methods described herein. In various embodiments, a thickness T1 of the cured layer of adhesive 552 may be less than 20% of a thickness T2 of the sandwich panel 500. In various embodiments, the thickness T1 may be less than 10% of the thickness T2. Furthermore, because the adhesive 552 may be the same as the blueprint adhesive, the repaired bond should be as strong or stronger than the original bond or originally designed bond using the blueprint adhesive, and as a result the repair may be classified as structural. A stronger joint is achieved using this method compared with many prior art methods even though less adhesive is used, owing mainly to the use of the high strength blueprint adhesive and the improved coverage of the joints. In many cases, high strength structural adhesives used to manufacture structural sandwich panels are not available in paste or liquid form, but mainly in forms such as films, so they could not be used with some of the prior art methods that require injection with a syringe. Paste or room temperature liquid adhesives typically possess relatively lower strength properties.

Figure 6:
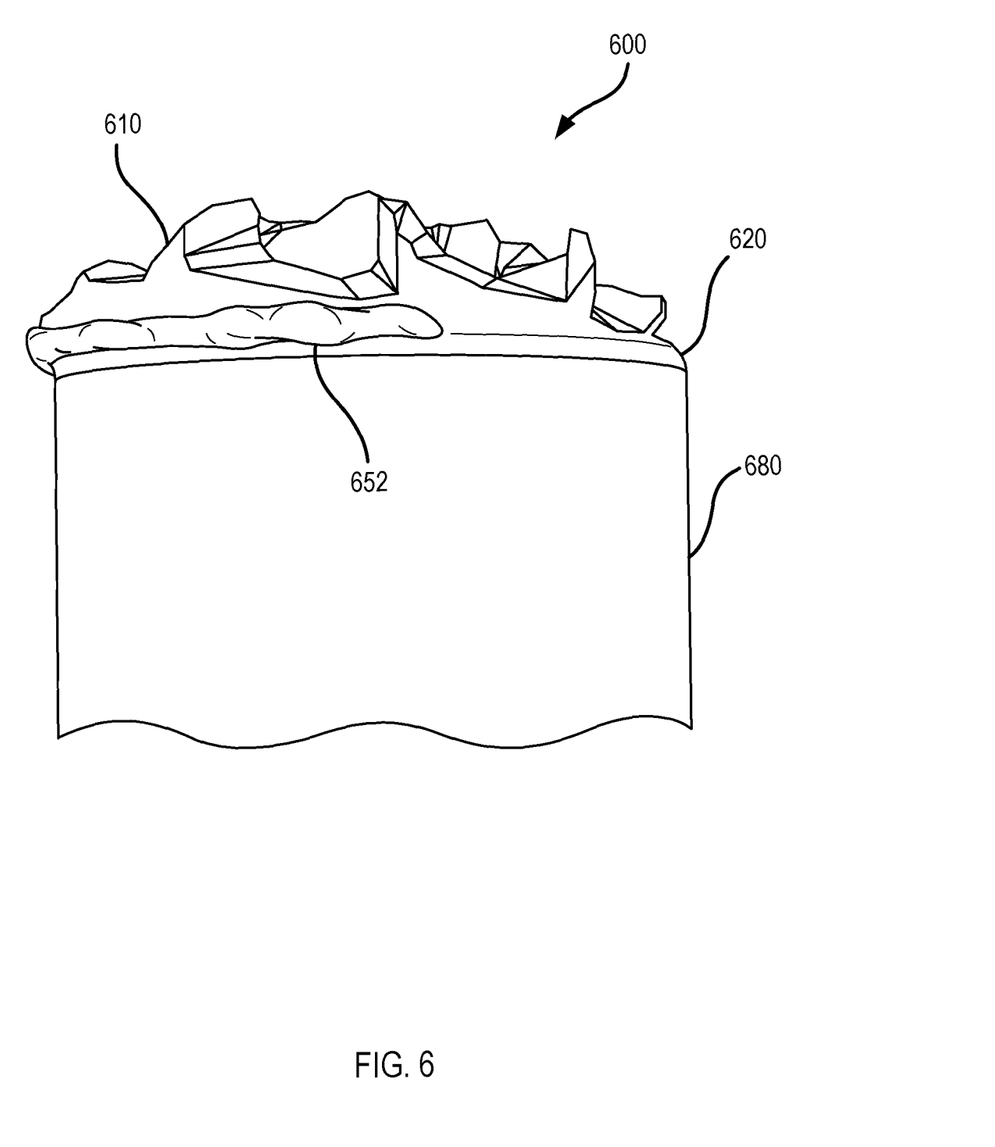
FIG. 6 illustrates a perspective view of a portion of a sandwich panel post repair and after a tensile test in accordance with various embodiments.

Referring to FIG. 6, a perspective view of a portion of a sandwich panel post repair and after a flatwise tensile test is illustrated. The sandwich panel 600 comprises the core 610, the first skin 620, and the film adhesive 652. A test fixture cylinder 680 was coupled to the first skin 620, and the cylinder 680 was pulled in a direction perpendicular to and away from the first skin 620, applying tension on the sandwich panel 600. As illustrated, the first skin 620 remained coupled to the core 610 via the film adhesive 652, while the failure was seen in the core itself, with the aluminum core tearing apart. The sandwich panel 600 was shown by the test to have an increased flatwise tensile strength of approximately 50% greater than the same measured value of an original part. In contrast, existing repair methods typically result in only partially restoring the flatwise tensile strength of the part.

Figure 7:
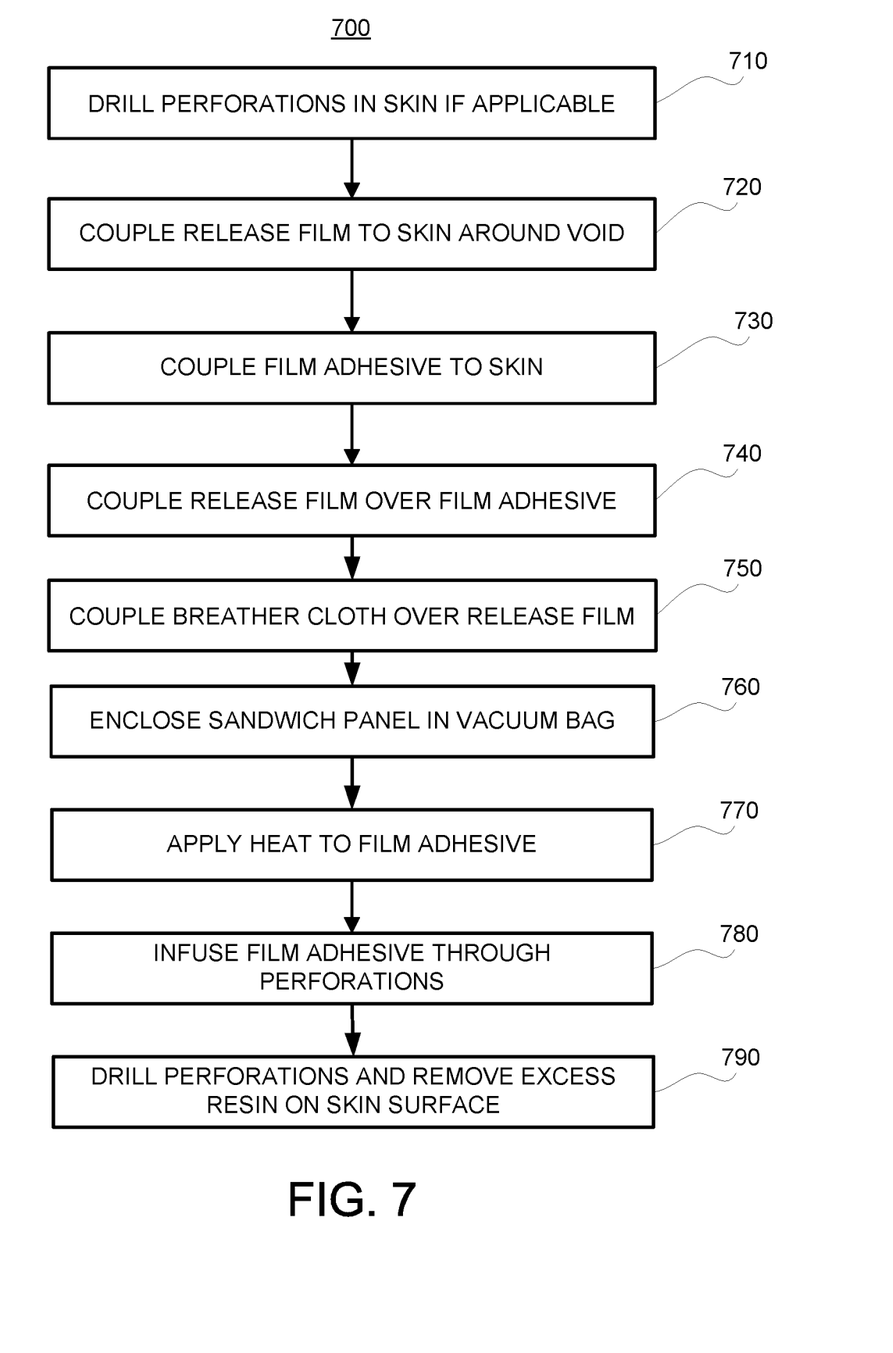
FIG. 7 illustrates a flowchart of a process for repairing a sandwich panel in accordance with various embodiments.

Referring to FIG. 7, a flowchart of a process for repairing a sandwich panel is illustrated according to various embodiments. A disbond may be detected in a sandwich panel. In various embodiments, perforations may be drilled into a first skin of the sandwich panel (step 710). However, in various embodiments perforations may already be present. A first release film may be coupled to the first skin of the sandwich panel around a disbond between the skin and a core of the sandwich panel (step 720). A plurality of layers of film adhesive may be positioned adjacent to the skin (step 730). A second release film may be coupled over the film adhesive (step 740). A breather cloth may be coupled over the second release film (step 750). The sandwich panel may be enclosed in a vacuum bag (step 760). Heat may be applied to the film adhesive (step 770). The film adhesive may liquefy and be infused through the perforations (step 780). The film adhesive may harden and bond the skin to the core. The perforations may be re-drilled to clear the film adhesive from the perforations, and excess resin may be removed from the skin surface (step 790).

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method of repairing a disbond in a structural sandwich panel comprising:
    positioning a film adhesive adjacent to the skin of the sandwich panel around a disbond between the skin and a core of the sandwich panel;
    coupling a first release film over the film adhesive;
    coupling a breather cloth over the film adhesive;
    enclosing the disbond in a vacuum bag; and
    applying heat to the film adhesive;
    positioning the sandwich panel such that an interior surface of the skin is facing away from a direction of gravity during the applying heat.

2. The method of claim 1, further comprising drilling perforations in the skin prior to the coupling the first release film to the skin.

3. The method of claim 1, wherein the sandwich panel comprises an acoustic sandwich panel.

4. The method of claim 1, further comprising drilling the film adhesive out of perforations in the skin.

5. The method of claim 1, wherein the heat is applied by a heat blanket.

6. The method of claim 1, further comprising using ambient pressure to force the film adhesive through perforations in the skin.

7. The method of claim 6, wherein after forcing the film adhesive through the perforations, a thickness of the film adhesive is less than 20% of a thickness of the sandwich panel.

8. The method of claim 1, wherein the film adhesive comprises a blueprint adhesive.

9. A repair method for a structural acoustic panel having a first skin, a second skin, and a cellular core bonded between the first skin and the second skin, with an area between the first skin and the cellular core defining a disbond, the method comprising,
    placing a film adhesive on an external surface of the first skin opposite an internal surface that is adjacent to the cellular core;
    heating the first skin and the film adhesive until the film adhesive liquefies adequately to flow;
    pushing the liquefied adhesive through the perforations formed through the first skin;
    wetting the internal surface of the first skin and walls of the cellular core with the liquefied adhesive; and
    curing the liquefied adhesive in place to form a bond between the first skin and the cellular core.

10. The method of claim 9, wherein the heating is performed using a heat blanket.

11. The method of claim 9, wherein the flowing is driven by ambient air pressure.

12. The method of claim 9, further comprising creating a vacuum within the structural acoustic panel.

13. The method of claim 9, further comprising positioning the structural acoustic panel with the internal surface facing opposite direction of gravity.

14. The method of claim 9, wherein after the pushing, a thickness of the liquefied adhesive is less than 20% of a thickness of the structural acoustic panel.

15. The method of claim 9, further comprising removing cured adhesive from the perforations in the first skin.

16. The method of claim 9, further comprising enclosing the structural acoustic panel in a vacuum bag.

17. The method of claim 9, wherein the film adhesive comprises a blueprint adhesive.

18. The method of claim 9, wherein the film adhesive comprises a plurality of layers of blueprint adhesive.

* * * * *